US007019855B1

United States Patent
Lee

(10) Patent No.: US 7,019,855 B1
(45) Date of Patent: Mar. 28, 2006

(54) METHOD FOR INFORMING A TRANSMITTING MODULE OF ERROR OCCURRENCE IN A RECEIVING PART OF A FACSIMILE

(75) Inventor: Yang-Yeon Lee, Kyonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1073 days.

(21) Appl. No.: 09/615,652

(22) Filed: Jul. 13, 2000

(30) Foreign Application Priority Data

Jul. 19, 1999 (KR) ............................. 1999/29100

(51) Int. Cl.
G06F 15/00 (2006.01)
H04N 1/00 (2006.01)
H04M 11/00 (2006.01)

(52) U.S. Cl. ..................... 358/1.15; 358/434; 358/435; 358/436; 358/437; 358/438; 358/439; 358/440; 379/100.05; 379/100.06; 379/100.09

(58) Field of Classification Search ............... 358/1.15, 358/1.16, 1.14, 434–440, 441, 405, 406, 358/407, 426.08, 426.09, 426.1, 426.11; 379/100.01–100.09
See application file for complete search history.

(56) References Cited

U.S. PATENT DOCUMENTS

| 4,994,926 A | * | 2/1991 | Gordon et al. ............... 358/434 |
| 5,289,532 A | * | 2/1994 | Ishikawa et al. ........ 379/100.14 |
| 5,822,074 A | * | 10/1998 | Deason et al. ............... 356/445 |
| 5,822,084 A | * | 10/1998 | Hwang ........................ 358/437 |
| 5,825,990 A | * | 10/1998 | Heo et al. ................... 358/1.14 |
| 5,835,240 A | * | 11/1998 | Kobayashi et al. ......... 358/468 |
| 6,144,459 A | * | 11/2000 | Satou ......................... 358/1.15 |
| 6,747,761 B1 | * | 6/2004 | Ranalli et al. .............. 358/434 |

* cited by examiner

Primary Examiner—Edward Coles
Assistant Examiner—Chan S. Park
(74) Attorney, Agent, or Firm—Robert E. Bushnell, Esq.

(57) ABSTRACT

A process and apparatus for informing a transmitting facsimile machine of occurrence of an error in a first receiving facsimile machine, including the steps of: inputting the telephone number of a second facsimile machine; when a ring signal is input from the transmitting facsimile machine, forming a communication line, exchanging protocols, and storing the telephone number of the transmitting facsimile machine among the protocols received from the transmitting facsimile machine; printing the fax data received from the transmitting facsimile machine, and determining whether or not an error has occurred at the same time; if an error has occurred, detecting an error message corresponding to the error from a pre-stored error tables and storing the error message; after the communication line is cut off from the transmitting facsimile machine due to the occurrence of the error, detecting the telephone number of the transmitting facsimile machine, and establishing a communication line; and when the communication line with the transmitting facsimile machine is established, transmitting error information to the transmitting facsimile machine.

13 Claims, 4 Drawing Sheets

2nd receiving part & Contents of error report

– DATE : 1999. 09. 09
– ERROR : RECEIVE MEMORY FULL
– 2nd receiving part : 0331-280-1744

Error occurs as described above thank you
for sending fax to 2nd receiving part

2nd receiving part & Contents of error report

- DATE : 1999. 09. 09
- ERROR : RECEIVE MEMORY FULL
- 2nd receiving part : 0331-280-1744

Error occurs as described above thank you for sending fax to 2nd receiving part

METHOD FOR INFORMING A TRANSMITTING MODULE OF ERROR OCCURRENCE IN A RECEIVING PART OF A FACSIMILE

This application makes reference to, incorporates herein and claims all rights accruing under 35 U.S.C. §119 from my earlier filing in the Korean Industrial Property Office of an application for a patent entitled Method For Informing A Transmitting Part Of Error Occurrence In A Receiving Part Of A Facsimile on the 19$^{th}$ day of July 1999, a copy of which is annexed hereto.

BACKGROUND OF THE INVENTION

1. Field of the Invention

This invention relates to a process for informing a transmitting facsimile machine of error occurrence in a receiving facsimile machine. More specifically, the present invention stores transmitting subscriber identification (TSI) information that is the telephone number of the transmitting facsimile machine, calls the telephone number in the event that a communication line is cut off due to error occurrence in received facsimile data, and informs the transmitting facsimile machine of error information including the contents of the error occurring in the receiving facsimile machine and the telephone number of another receiving facsimile machine that is capable of serving as the first receiving facsimile machine.

2. Description of the Related Art

Generally, a facsimile machine includes a scanner for reading a document, a printer for outputting data in the shape of letters, and a communication member such as a telephone cable for transmitting/receiving data to/from the other party in a wide area, and the components are integrally formed to allow documents to be exchanged between two parties. In order to transmit and receive fax data using such a facsimile machine, protocols are exchanged between the transmitting facsimile machine (i.e., a transmitter) and the receiving facsimile machine (i.e., a receiver). In the event that an error occurs within the receiving facsimile machine such as, by way of example, a paper jam, depletion of the paper, a toner low condition, a full memory and the like, while facsimile data is being transmitted from the transmitting facsimile machine to the receiving facsimile machine, the receiving facsimile machine cannot receive further data. Accordingly, the receiving facsimile machine transmits a disconnect command (i.e., a DCN signal), that indicates the termination of communication, to the transmitting facsimile and cuts off the communication line.

I have noticed that, when the communication line is interrupted or otherwise discontinued due to the occurrence of an error at the receiver, the transmitter module tries to re-transmit the facsimile data. When the error in the receiver continues, the call from the transmitter may not be completed within Phase A. As a result, the transmitter does not know that the error has occurred in the receiver and continuously tries to transmit fax data from the transmitting facsimile machine. Moreover, I have found that the transmitter is unable to determine the type of error occurring in the receiver, and in the event that the transmitter does not know the number of another facsimile, the transmitter continuously redials the same number until the call has been completed with the receiver.

SUMMARY OF THE INVENTION

It is, therefore, an object of the present invention to provide an improved apparatus and process for facsimile telecommunication.

It is another object to provide an apparatus and a process which are able to compensate for errors that occur during the reception of facsimile telecommunications.

It is still another object to provide a process for transmitting error information, including the contents of an error occurring in the receiving facsimile machine and the telephone number of another facsimile machine which is capable of receiving fax data instead of the receiving facsimile machine in which the error has occurred. As a result, fax data can be continuously transmitted even though the error has occurred in the receiving facsimile machine while the fax data is being transmitted.

These and other objects may be attained with a facsimile circuit and process that performs the functions and steps of: informing the transmitting facsimile machine of an error occurrence in a first receiving facsimile machine by inputting the telephone number of a second facsimile machine for receiving fax data when an error occurs in the first receiving facsimile machine while the first receiving facsimile machine is receiving the fax data; when a ring signal is input from the transmitting facsimile machine, forming a communication line, exchanging protocols and storing the telephone number of the transmitting facsimile machine, that is TSI information, among the protocols received from the transmitting facsimile machine; printing the fax data received from the transmitting facsimile machine, and determining whether an error occurs at the same time; if an error occurs, obtaining an error message corresponding to the error from a pre-stored error table and storing the error message; after the communication line is cut off from the transmitting facsimile machine due to the error occurrence, detecting the telephone number of the transmitting facsimile machine and forming the communication line; and when the communication line with the transmitting facsimile machine is formed, transmitting error information occurring in the transmission from the receiving facsimile machine to the transmitting facsimile machine.

The error information includes at least the telephone number of the second facsimile machine and the error message. When the telephone number of the transmitting facsimile machine and the communication line are formed, the error information is changed into bit-map data. The error information of the transmission from the receiving facsimile machine to the transmitting facsimile machine is printed in the transmitting facsimile machine in a predetermined manner. Preferably, the error table is a look-up table including at least one error message respectively corresponding to at least one error that may occur in the facsimile transmission.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
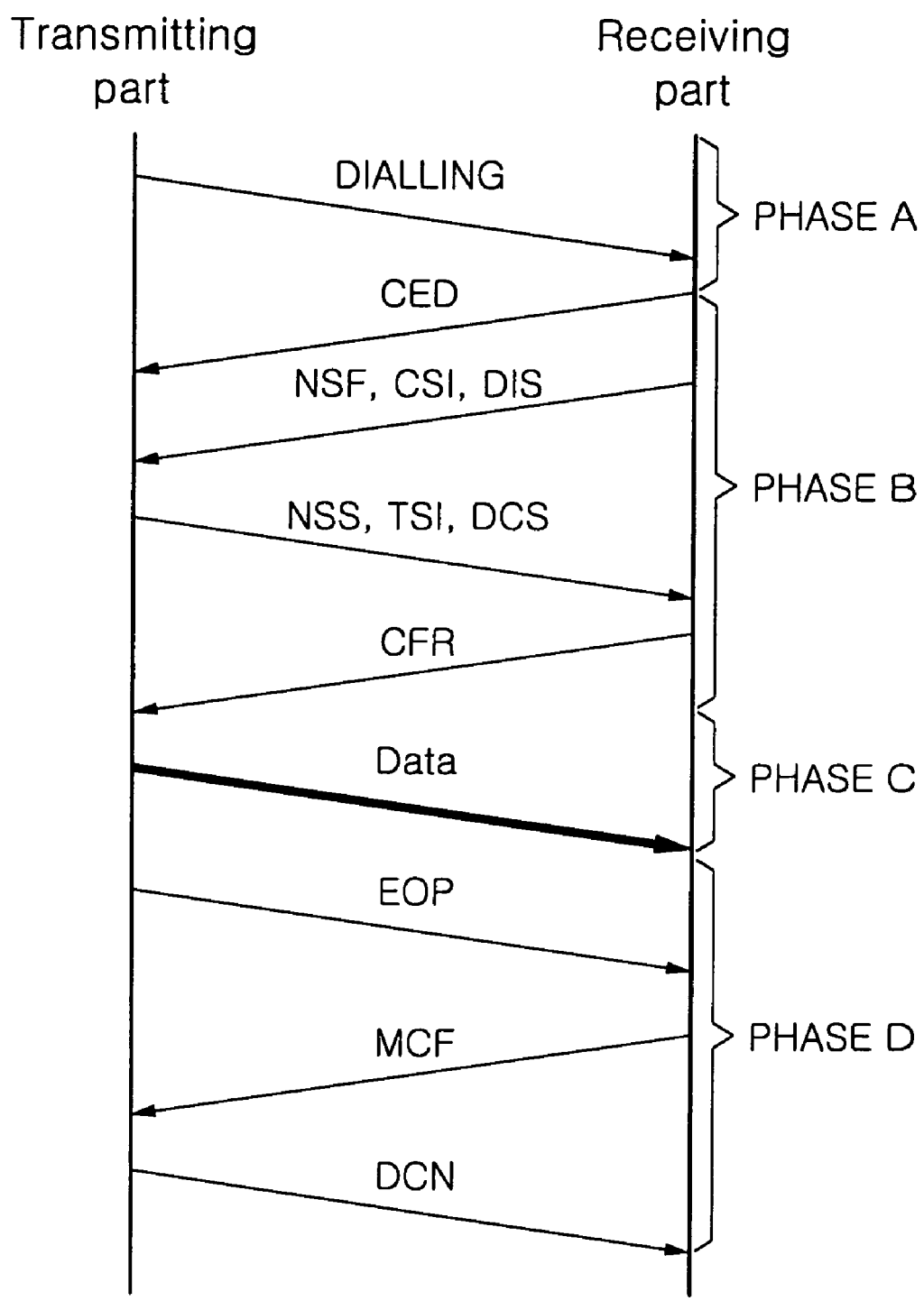
FIG. 1 is a conceptional view illustrating a protocol for transmitting and receiving facsimile telecommunications data.

Turning now to the drawings, FIG. 1 is a conceptional view illustrating a protocol for transmitting and receiving fax data. Calls are placed during Phase A. The transmitting facsimile machine, while in a hook-off state, transmits a calling tone (CNG) signal to the receiving facsimile machine by dialing until the receiving facsimile machine responds. Upon reception of the CNG signal from the transmitting facsimile machine, the receiving facsimile machine transmits a called station identification (CED) signal, that is, a responsive signal, to the transmitting facsimile machine.

In Phase B, the states of terminals and transmitting lines are checked and the terminals are controlled. At this time, the transmitting and receiving standby states and the synchronizing state of the terminals are checked, and the fax data is prepared for transmission. More particularly, during Phase B, the receiving facsimile machine transmits the CED signal to the transmitting facsimile machine, and then transmits non-standard facilities signals (NSF) used for recognizing specific user demand that cannot be covered by T recommendation. This is called subscriber identification (CSI) and is used for supplying a specific identifying member of a subscriber of the receiving facsimile machine by means of an international telephone number, and a digital identification signal (DIS) that specifies the standard CCITT capability of equipment of the receiving facsimile machine to the transmitting facsimile machine.

The transmitting facsimile machine understands the state of the receiving facsimile machine by receiving signals transmitted from the receiving facsimile machine, and then transmits a non-standard facilities set-up (NSS), that is, a digital command responding to information included in the NSF signal, transmits subscriber identification (TSI) used for supplying a specific identifying member of a subscriber of the transmitting facsimile machine by means of the international telephone number, and transmits a digital command signal (DCS), that is, a digital setup command responding to the standard capacity checked by the DIS signal.

When an environment for transmitting fax data is fixed as described above, the transmitting facsimile machine finally determines fax data transmission speed between the transmitting facsimile machine and the receiving facsimile machine through a training check (TCF) process, and the receiving facsimile machine transmits a confirmation to receive (CFR), that is, a responding signal for confirming start of message transmission corresponding to TCF of the transmitting facsimile machine.

In Phase C, message transmission, message transmission check and synchronization maintenance are performed.

In Phase D, message and reception is terminated. The transmitting facsimile machine transmits end of procedure (EOP) showing completion of message transmission, and the receiving facsimile machine transmits message confirmation (MCF), showing that the entire message has been satisfactorily received, to the transmitting facsimile machine. Upon receiving the MCF from the receiving facsimile machine, the transmitting facsimile machine transmits a disconnect (DCN), that is, a command showing termination of communication, and cuts off the communication line.

As described above, fax data transmission between the transmitting facsimile machine and the receiving facsimile machine is performed through exchange of protocols. However, in the event that an error, such as a paper jam, paper empty, toner low, memory full, and the like, occurs in the receiving facsimile machine while fax data is being transmitted from the transmitting facsimile machine to the receiving facsimile machine, the receiving facsimile machine cannot receive further data. Accordingly, the receiving facsimile machine transmits the DCN to the transmitting facsimile machine, and cuts off the communication line.

When the communication line is cut off due to error occurrence in the receiving facsimile machine, the transmitting facsimile machine tries to transmit fax data again. However, if the error occurring in the receiving facsimile machine is not removed, a call is not determined in Phase A. As a result, the transmitter does not know of the error occurrence in the receiving facsimile machine, and continuously tries to transmit fax data from the transmitting facsimile machine. Moreover, the transmitter cannot check the type of error occurring in the receiving facsimile machine and, in the event that the transmitter does not know the number of another facsimile machine, the transmitter needs to continuously dial the same number until the call with the receiving facsimile machine is established.

The present invention will now be described more fully hereinafter with reference to the accompanying drawings. Like reference symbols in the drawings indicate the same or similar components. Specification of components, such as components of circuits, are provided for the purpose of description. It is, therefore, apparent to those skilled in this art that the present invention can be embodied without the specified components. A detailed description might be omitted when it is determined that related prior art or the detailed description of the structure may unnecessarily make the point of the present invention indistinct.

Figure 2:
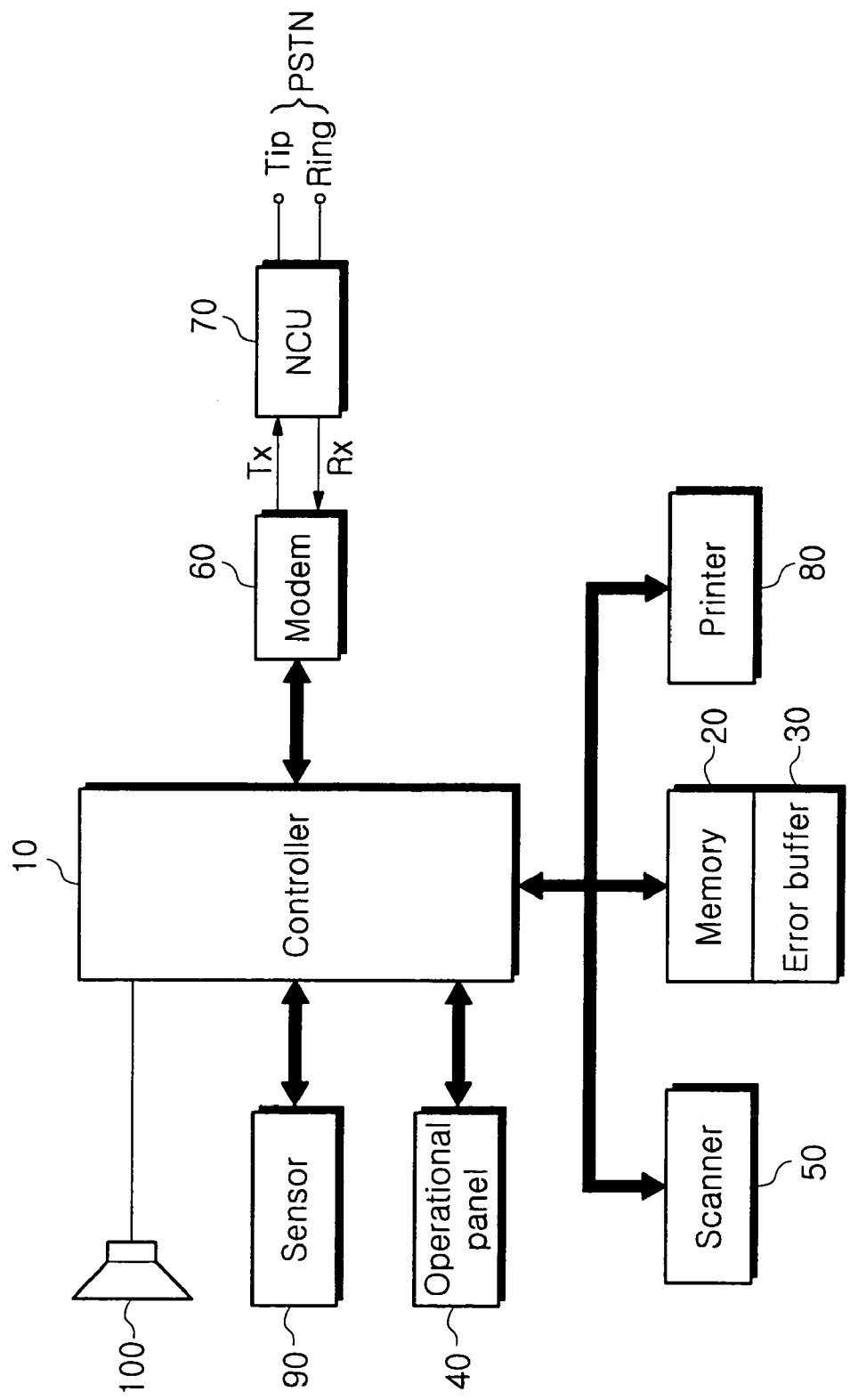
FIG. 2 is a schematic block diagram of a facsimile telecommunications system suitable for the practice of the present invention.
Figure 3:
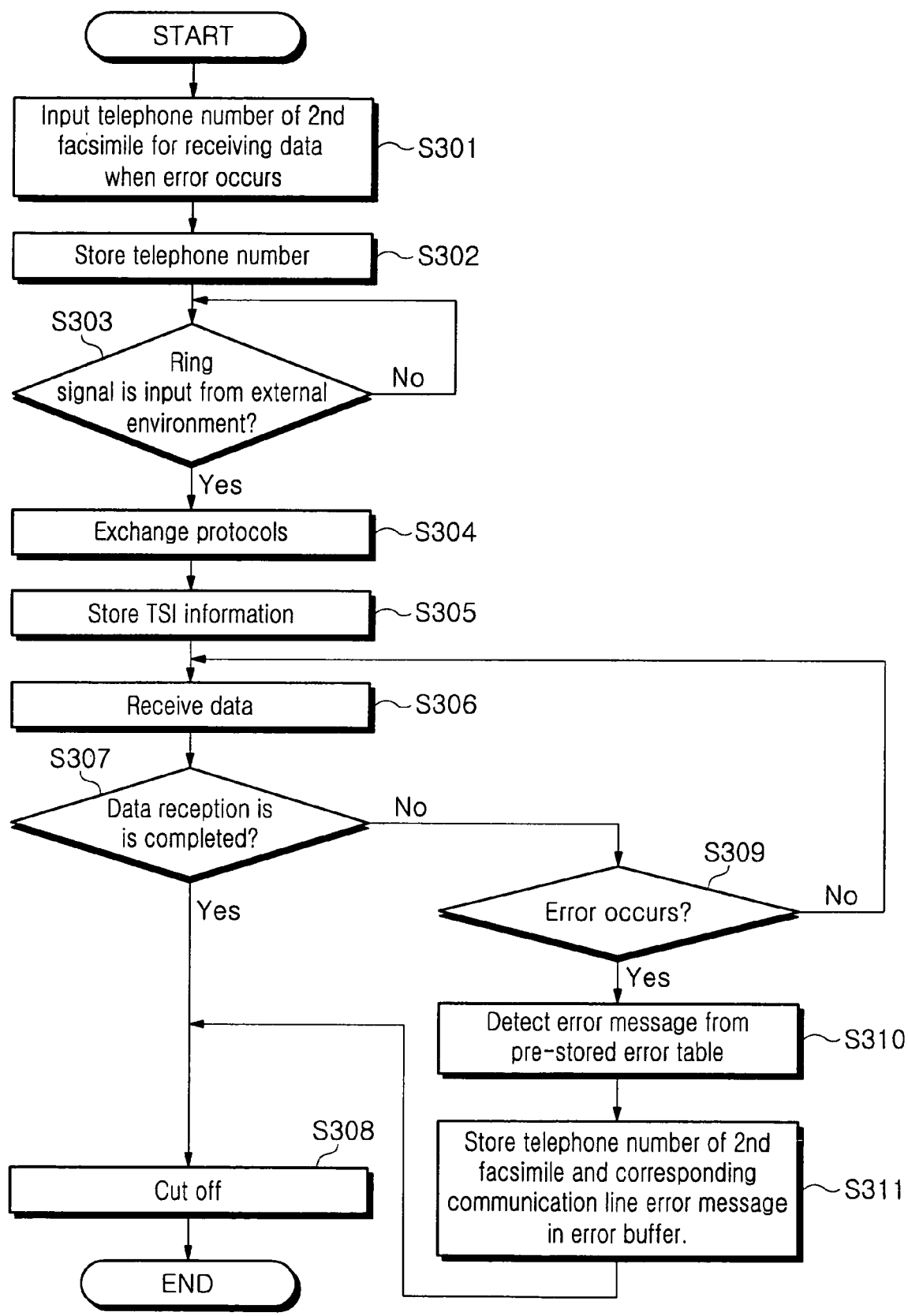
FIG. 3 is a flowchart illustrating the storage of error information when an error occurs within the receiving facsimile machine.
Figures 4, 5:
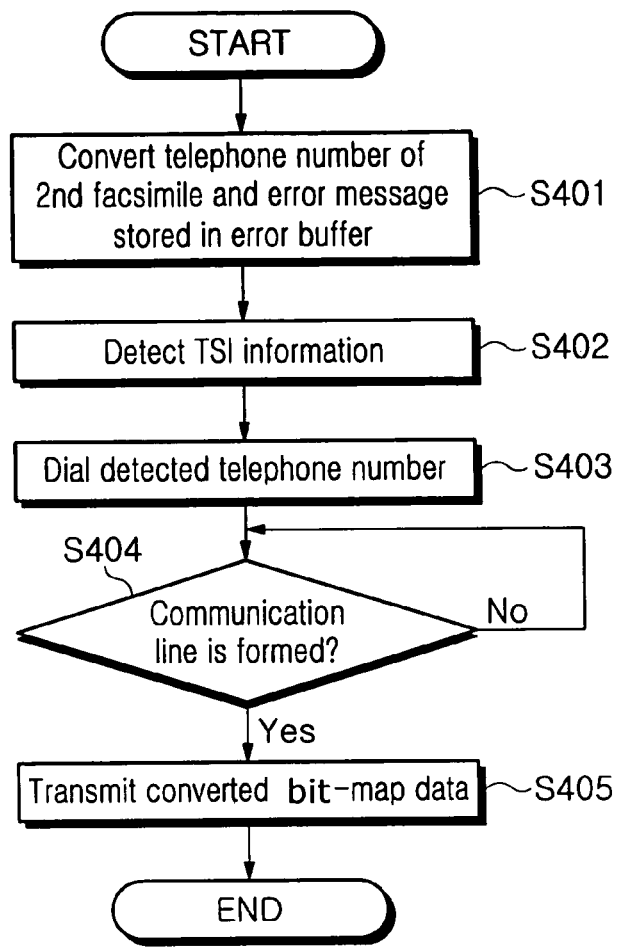
FIG. 4 is a flowchart illustrating the transmission of error information, stored by the operation shown in FIG. 3, to the transmitting facsimile machine.
FIG. 5 is an embodiment of a report received from the transmitting facsimile machine, in which report the error information of the receiving facsimile machine is included.

FIG. 2 is a schematic block diagram of a facsimile machine to which the present invention is applied; FIG. 3 is a flowchart of a process of storing error information when an error occurs in the receiving facsimile machine; FIG. 4 is a flowchart of a process of transmitting the error information, stored by the operation of FIG. 3, to the transmitting facsimile machine; and FIG. 5 is an embodiment of a report received from the transmitting facsimile machine, in which report the error information of the receiving facsimile machine is included.

Referring to FIG. 2, a controller 10 generally controls the system according to a predetermined program. Particularly, the controller 10 controls the system to transmit, to the transmitting facsimile machine, the telephone number of a second facsimile machine, which telephone number is stored in advance, and error information, in the event that an error occurs while the fax data is being received.

Thus, the invention provides a facsimile transmitting apparatus that includes a means (an informing means) for furnishing information to the apparatus concerning error occurrence, and the structures that accomplish this function are described next. As will appear, in a preferred embodiment of the invention, the informing means comprises a means for furnishing the transmitting facsimile apparatus with information concerning the nature of an error (for example, "out of paper" error) occurring at the receiving facsimile apparatus, as well as a telephone number of a second facsimile apparatus that is capable of receiving the facsimile message when the first facsimile apparatus is inoperative, for example, out of paper.

A memory 20 includes an operation program for operating controller 10 and a general control program, and stores data produced by the performance of the program by controller 10. Particularly, according to a preferred embodiment of the present invention, the telephone number of the second facsimile machine is input by a user through an operational panel 40 in order to receive the fax data in that machine instead of the first facsimile machine in the event that an error occurs while the first facsimile machine is receiving fax data. An error table, including messages corresponding to various errors that may occur while the fax data is being received, is stored in memory 20. Furthermore, TSI information showing the telephone number of the transmitting facsimile machine, among the signals received from the transmitting facsimile machine while the protocol is exchanged, is stored in the memory in order to transmit the pre-stored telephone number of the second facsimile machine and the error information detected from the error table to the transmitting facsimile machine in the event that an error occurs while the fax data is being received.

The telephone number of the second facsimile machine stored in memory 20, and an error message corresponding to the error occurring while the fax data is received among the error messages stored in the error table, are stored in an error buffer 30 under the control of controller 10 in the event that an error occurs while fax data is being received. Operational panel 40 includes a plurality of keys. Operational panel 40 supplies controller 10 with key data output when the keys are pressed and includes a displaying member for displaying the operating state of the system by means of display data of controller 10. A scanner 50 scans a document, converts the image of the document into binary data, and supplies controller 10 with the binary data.

A modem 60 modulates and demodulates input and output signals of controller 10. A network control unit (NCU) 70 forms a communication line between a public switching telephone network (PSTN) and modem 60 under the control of controller 10. A printer 80 prints data received from the external environment through modem 60, or data scanned in scanner 50 and stored in memory 20, under the control of controller 10. A sensor 90 inputs the state of the document and papers into controller 10, and a speaker 100 generates a warning sound corresponding to a control signal of controller 10.

The operation of the invention having the above-mentioned structure will be described in detail with reference to FIGS. 3 thru 5. FIG. 3 is a flowchart of a process for storing error information to be transmitted to the transmitting facsimile machine in the event that an error occurs in the receiving facsimile machine. First, a user inputs, through operational panel 40, the telephone number of the second facsimile machine to receive the fax data when fax data cannot be received by the receiving facsimile machine due to error occurrence (S301). Controller 10 stores the telephone number of the second facsimile machine input by the user, in memory 20 (S302). Thereafter, controller 10 determines whether or not a ring signal is input from the external environment through the PSTN (S303). If the ring signal is input, controller 10 forms a communication line and performs protocol exchanges (S304).

Controller 10 exchanges protocols with the transmitting facsimile machine by controlling modem 60 and NCU 70, detects the TSI information received from the transmitting facsimile machine, i.e., the telephone number of the transmitting facsimile machine in Phase B, and stores the telephone number in memory 20 (S305). Then, controller 10 receives data transmitted from the transmitting facsimile machine, prints the data by means of printer 80 (S306), and determines whether or not the data is completely received (S307).

If it is determined that the data is completely received, the communication line with the transmitting facsimile machine is cut off (S308). Conversely, if it is determined that the data is not completely received, it is determined whether or not an error has occurred in the facsimile machine (S309). If it is determined that an error has not occurred in the facsimile machine, step S309 is followed by step S306 to receive data from the transmitting facsimile machine. conversely, if it is determined that an error has occurred in the facsimile machine and it is impossible to receive further fax data, controller 10 determines the type of error occurring in the facsimile machine, and obtains an error message corresponding to the determined error from the error table stored in memory 20 (S310).

The error table includes, in look-up table style, various error messages respectively corresponding to the errors that may occur in the facsimile machine. The error table is stored when the facsimile machine is manufactured. Controller 10 stores the telephone number of the second facsimile machine, as input by the user at step S301, and the error message detected at step S310, in error buffer 30 (S311). Step S311 is followed by step S308 of cutting off the communication line with the transmitting facsimile machine. Now, the process of transmitting the error information, including the error message generated in the receiving facsimile machine and the telephone number of the second facsimile machine, to the transmitting facsimile machine in the event that an error occurs in the receiving facsimile machine while the fax data is being transmitted will be described with reference to FIG. 4.

FIG. 4 is a flowchart of the process for transmitting the error information, stored in error buffer 30 according to the operation of FIG. 3, to the transmitting facsimile machine. In the event that the communication line with the transmitting facsimile machine is cut off due to the occurrence of an error in the receiving facsimile machine while the fax data is being received, controller 10 converts the error information stored in error buffer 30, i.e., the telephone number of the second facsimile machine and the error message, into bit-map data (S401). When the telephone number of the second facsimile machine and the error message are completely converted into bit-map data, the TSI information (telephone number of the transmitting facsimile machine), detected at step S305 of FIG. 3 and stored in memory 20, is detected (S402), and the detected telephone number is dialed (S403).

When a communication line with the transmitting facsimile machine is established (S404), controller 10 transmits the bit-map data converted and stored in error buffer 30 at step S401 (S405). Therefore, even though the communication line is cut off due to the occurrence of an error in the receiving facsimile machine while the fax data is being transmitted, the transmitting facsimile machine can continuously transmit the transmission-interrupted fax data according to the error information, including the nature of the error and the telephone number of the second facsimile machine which is capable of receiving the fax data in place of the receiving facsimile machine. In other words, the transmitting facsimile machine can easily check the state of the receiving facsimile machine by outputting the error information transmitted from the receiving facsimile machine as shown in FIG. 5. Therefore, the transmitting facsimile machine can transmit fax data that is not completely transmitted to the second receiving facsimile machine.

The several embodiments of this invention has been described above with reference to the aforementioned embodiments. It is evident, however, that many alternatives, modifications and variations will be apparent to those having skill in the art in light of the foregoing description. Accordingly, the present invention embraces all such alternatives, modifications and variations as fall within the spirit and scope of the appended claims and their equivalents.

The foregoing paragraphs describe a process and telecommunications circuit which is able to compensate for the unexpected occurrence of a malfunction within the receiving facsimile machine, which malfunction prevents the prompt transmission of facsimile data from the transmitting facsimile machine to the malfunctioning receiving facsimile machine. Compensation is accomplished by the expedient of storing the transmitting subscriber identification (TSI) information, that is, the telephone number of the transmitting facsimile machine, by having the receiving facsimile machine call that telephone number in the event that a communication line is cut off due to occurrence of an error in the received facsimile data, and by informing the transmitting facsimile machine of error information, including the type of error occurring in the receiving facsimile machine and the telephone number of an alternate receiving facsimile machine that is capable of serving as the first receiving facsimile machine. According to the principles of the present invention, the receiving facsimile machine informs the transmitting facsimile machine of occurrence of an error in the receiving facsimile machine of the facsimile, the transmitting facsimile machine is informed of error information, including the nature of the error occurring in the receiving facsimile machine and the telephone number of the second receiving facsimile machine in the event that an error occurs while fax data is being received and it is impossible to receive further fax data. Therefore, the transmitting facsimile machine can continuously transmit the fax data to the second receiving facsimile machine in accordance with the telephone number of the second receiving facsimile machine and the contents of the error report transmitted from the receiving facsimile machine in which the error occurred. As a result, the present invention provides the advantages of easy checking of the nature of the error occurring in the receiving facsimile machine, and rapid transmission of the fax data.

What is claimed is:

1. In a process for transmitting a facsimile message from a transmitting facsimile machine to a first receiving facsimile machine, a subprocess for informing the transmitting facsimile machine of error occurrence at the first receiving facsimile machine, said subprocess comprising the steps of:
    (1) inputting a telephone number of a second receiving facsimile machine to be used when an error occurs at said first receiving facsimile machine while said first receiving facsimile machine is receiving said facsimile message;
    (2) when a ring signal is input from said transmitting facsimile machine, forming a communication line, exchanging protocols of said transmitting facsimile machine and of said first receiving facsimile machine, and storing a telephone number of said transmitting facsimile machine among said protocols received from the transmitting facsimile machine;
    (3) printing fax data received from said transmitting facsimile machine and simultaneously checking whether an error occurs;
    (4) when an error occurs, obtaining an error message corresponding to said error from a pre-stored error table and storing said error message;
    (5) when said communication line is cut off from said transmitting facsimile machine due to said error occurrence, detecting said telephone number of said transmitting facsimile machine and forming a communication line therewith; and
    (6) when said communication line with said transmitting facsimile machine is formed, transmitting error information occurring at said receiving facsimile machine, wherein said error information includes at least said telephone number of said second receiving facsimile machine and said error message.

2. In the process of claim 1, wherein, before said communication line with said transmitting facsimile machine is cut off, said telephone number of said second receiving facsimile machine and said error message are stored in an error buffer.

3. In the process of claim 1, further comprising the step of converting said error information into bit map data when said telephone number of said transmitting facsimile machine is detected and said communication line with said transmitting facsimile machine is formed.

4. In the process of claim 1, wherein said error information is printed in said facsimile message.

5. In the process of claim 1, wherein said error table is a look-up table including at least one error message respectively corresponding to at least one error that may occur in transmission of said facsimile message.

6. In a system which includes a transmitting facsimile apparatus for transmitting a facsimile message to a first receiving facsimile machine, said transmitting facsimile apparatus comprising:
    a scanner for reading a document;
    means for transmitting and receiving information;
    means for exchanging protocols with said first receiving facsimile machine; and
    a printer;
    the improvement comprising:
    informing means located at said first receiving facsimile machine for furnishing information concerning error occurrence to the transmitting facsimile apparatus, wherein said informing means furnishes the transmitting facsimile apparatus with information concerning nature of an error occurring at the first receiving facsimile machine, and a telephone number of a second receiving facsimile machine that is capable of receiving the facsimile message in the event of error at the first receiving facsimile machine.

7. In the system of claim 6, further comprising:
    means for inputting the telephone number of the second receiving facsimile machine to be used when the error occurs at said first receiving facsimile machine while said first receiving facsimile machine is receiving said facsimile message;
    means for forming a communication line when a ring signal is input from said transmitting facsimile apparatus;
    means for exchanging protocols of said transmitting facsimile apparatus and of said first receiving facsimile machine when the communication line is formed;
    means for storing a telephone number of said transmitting facsimile apparatus among said protocols received from the transmitting facsimile apparatus when the protocols are exchanged;

means for printing said facsimile message received from said transmitting facsimile apparatus and for simultaneously determining whether an error occurs;

means for obtaining an error message corresponding to said error from a pre-stored error table when the error occurs;

means for storing said error message;

means for obtaining said telephone number of said transmitting facsimile apparatus and forming a communication line therewith when said communication line is cut off from said transmitting facsimile apparatus due to occurrence of the error; and means for transmitting error information to said transmitting facsimile apparatus when said communication line with said transmitting facsimile apparatus is formed.

8. In the system of claim 7, further comprising error buffer means for storing said telephone number of said second receiving facsimile machine and said error message before said communication line with said transmitting facsimile apparatus is cut off.

9. In the system of claim 7, further comprising means for converting said error information into bit map data when said telephone number of said transmitting facsimile apparatus is obtained and said communication line with said transmitting facsimile machine is formed.

10. In the system of claim 7, wherein said printing means prints said error information in said facsimile message.

11. In the system of claim 7, further comprising a look-up table containing at least one error message respectively corresponding to at least one error that may occur in transmission of said facsimile message.

12. In the process of claim 1, wherein step (1) comprises automatically inputting the telephone number of the second receiving facsimile machine to be used when the error occurs at said first receiving facsimile machine while said first receiving machine is receiving said facsimile message.

13. In the system of claim 7, wherein said means for inputting the telephone number of the second facsimile machine automatically inputs the telephone number of the second facsimile machine to be used when the error occurs at said first receiving facsimile machine while said first receiving facsimile machine is receiving said facsimile message.

* * * * *